United States Patent [19]
Liew et al.

[11] Patent Number: 5,734,677
[45] Date of Patent: Mar. 31, 1998

[54] METHOD FOR COMPRESSION OF LOSS-TOLERANT VIDEO IMAGE DATA FROM MULTIPLE SOURCES

[75] Inventors: Soung Chang Liew; Chi-Yin Tse, both of Hong Kong, Hong Kong

[73] Assignee: The Chinese University of Hong Kong, Shatin, Hong Kong

[21] Appl. No.: 404,689

[22] Filed: Mar. 15, 1995

[51] Int. Cl.⁶ .................. H04B 1/66; H04N 1/41
[52] U.S. Cl. .............. 375/240; 370/477; 382/239; 348/420
[58] Field of Search .................. 375/240; 348/401, 348/420; 341/87; 382/239; 370/118, 477

[56] References Cited

U.S. PATENT DOCUMENTS

| | | | |
|---|---|---|---|
| Re. 35,093 | 11/1995 | Wang et al. | 348/420 |
| 4,802,232 | 1/1989 | Altes | 382/239 |
| 4,872,009 | 10/1989 | Tsukiyama et al. | 314/95 |
| 4,916,537 | 4/1990 | Nakayama et al. | 348/390 |
| 4,951,139 | 8/1990 | Hamilton et al. | 348/404 |
| 4,963,030 | 10/1990 | Makur | 348/422 |
| 5,115,309 | 5/1992 | Hang | 370/118 |
| 5,198,940 | 3/1993 | Nagasawa et al. | 360/9.1 |
| 5,218,650 | 6/1993 | Blonstein et al. | 382/56 |
| 5,231,484 | 7/1993 | Gonzales et al. | 348/405 |
| 5,289,276 | 2/1994 | Siracusa et al. | 348/469 |
| 5,339,108 | 8/1994 | Coleman et al. | 348/408 |
| 5,473,378 | 12/1995 | Tamitani | 348/416 |
| 5,473,379 | 12/1995 | Horne | 348/416 |
| 5,509,017 | 4/1996 | Brandenburg et al. | 370/118 |
| 5,563,960 | 10/1996 | Shapiro | 382/239 |

OTHER PUBLICATIONS

Pancha et al. "MPEG Coding For Variable Bit Rate Video Transmission", May 1994, IEEE Communications Magazine

*Primary Examiner*—Stephen Chin
*Assistant Examiner*—Jeffrey W. Gluck
*Attorney, Agent, or Firm*—Townsend and Townsend and Crew LLP; Kenneth R. Allen

[57] ABSTRACT

Data as may be employed in telecommunication is segmented into blocks, each block having associated therewith a metric of distortion as a function of the number of bits in the block to represent the quality of the data contained in the block. Within the blocks, bits are ordered according to significance. The blocks are then ranked according to the distortion metric, then the lowest significant bits of blocks having the lowest distortion metrics are dropped and bits are allocated to other blocks having the highest distortion metrics in order to redistribute the quality or distortion of each of the blocks for transmission (or subsequent compressed storage). Each of the blocks can thus be transmitted at substantially the same level of distortion within a channel which is bandwidth restricted compared to the maximum possible resolution of the data, thus minimizing imbalances in quality among the blocks of data and maximizing channel efficiency. A particular application of this data compression technique is in video data compression wherein each of the data blocks contains the coefficients of a discrete cosine transform, wherein the quality of the data actually needs to be substantially equal among all the blocks of data and wherein the data itself is loss-tolerant within each of the blocks of data. The invention has particular application in an MPEG block encoding and decoding scheme. A further application of this data compression technique is in the multiplexing of blocks of data from different images into a common channel for transmission.

26 Claims, 9 Drawing Sheets

METHOD FOR COMPRESSION OF LOSS-TOLERANT VIDEO IMAGE DATA FROM MULTIPLE SOURCES

BACKGROUND OF THE INVENTION

This invention relates to compression of data and particularly to compression of data which has previously been compressed and which is of a nature which is tolerant of losses. In particular, the invention relates to post compression of block video data for the purpose of transmission over a constant bandwidth channel.

Future broadband integrated services networks are expected to carry information from a large variety of different services and applications. However, video traffic is likely to dominate, thanks to the bandwidth-hungry nature of images. It is therefore important to understand how video traffic might best be multiplexed, transported, and switched. Although widespread digital video transmission is now on the horizon with the introduction of ATM (Asynchronous Transfer Mode) based networks, there remain a number of problems which must be addressed. Where information from a group of video sessions are to be delivered as a bundle to one or more destinations (e.g., entertainment-video broadcast and video-on-demand), particular issues must be addressed.

In ATM networks, data are packetized into fixed-length cells of 53 bytes according to the current international standard. Cells are routed in the network independently, based on the routing information contained in a 5-byte header. These cells may be discarded inside the network when traffic congestion occurs.

To reduce the bandwidth needed, video is almost always compressed before transmission. The Moving Picture Experts Group (MPEG) coding scheme has been developed, and it has evolved as a standard of video compression. Since signals have been highly compressed, cell loss during transmission of MPEG-coded video may cause serious degradation of image quality.

Compression methods of a video stream can be divided into two classes: variable bit-rate (VBR) compression and constant bit-rate (CBR) compression. For a given video stream, bandwidth requirements may vary over time just to maintain a constant image quality, due to the variation of the scene contents of the underlying video sequence.

In VBR compression of video data, the output bit rate of the encoder varies over time according to the bandwidth requirements of the underlying video sequence. Therefore, the image quality is more or less constant. MPEG is a form of VBR compression.

In CBR compression of video data, on the other hand, the output bit rate of the encoder is forced to be constant. The image quality varies over time, since scenes that intrinsically demand high bandwidths may have their bandwidths cut down to maintain the established constant output bit rate. There may also be compression schemes that lie somewhere between the two extremes. In general, in the consideration of compression, there is a kind of "uncertainty principle" which consists of the tradeoff between the variations of bit rate and image quality. Quality will vary with both image detail within each time frame and with time as image detail level changes at each block location in an image. (As explained hereinbelow, according to the invention, a metric is used which recognizes this tradeoff.)

CBR compression has many advantages from the network or data communication point of view. Bandwidth allocation and tariff arrangements for network usage are simple. For instance, for a public network, a user can simply acquire a CBR channel of sufficient maximum bandwidth and be charged according to the channel bandwidth and duration of usage.

It is typically straightforward to multiplex several CBR channels onto a common communication channel and guarantee the delivery of cells, since the cells arrive at a predictable rate. In contrast, it is difficult to multiplex VBR video streams, such as a number of simultaneous MPEG datastreams, with a guarantee of the delivery of all original cells, since the multiplexed streams of this type may all output a large number of bits together at a particular moment in time. Conventionally, a bandwidth larger than the average bandwidth usage of a VBR stream must be allocated to the datastream to maintain a small cell-loss probability. Even then, absolute cell-delivery guarantee is not possible unless the expected peak bandwidth is allocated to the datastream, in which case the delivery of the VBR stream is much more expensive than the corresponding CBR stream. For public networks, the fact that cells may be dropped due to interference from other streams also complicates the tariff problem and the contractual arrangements between the network operator and user.

In short, VBR compression has the advantage of smoother image quality and CBR compression has the advantage of simple network operation.

When transporting a number of video streams as a bundle, the advantages of VBR and CBR can be achieved simultaneously by the user performing multiplexing before the data enter the network for delivery.

A straightforward method of the prior art is to first VBR-compress each stream and then packetize the output data into cells before multiplexing the cells from separate streams into the common CBR channel. In this way, one attempts to achieve simultaneously the advantages of simple network operation of the CBR channel and the smooth image quality of the VBR streams. In other words, as a group, the video bundle is CBR, but individually, the video streams are VBR.

The problem with the technique of post-compression multiplexing is that cells may need to be dropped by the user at the boundary of the network when the VBR streams all output high bit rates simultaneously.

A two-layer video coding and transmission strategy has been investigated by many researchers for minimizing the quality degradation due to cell loss. In this approach, VBR-coded data of a video stream are prioritized and divided into two groups: a base layer and a second layer. The base layer contains important data that correspond to basic-quality images, and the second layer contains image-enhancement data. There are guaranteed streams (GSs) which are made up of the base layers, and their transmission is guaranteed. Then there are enhancement streams (ESs), which are made up of the second layer. Their cells may be dropped when the common CBR channel does not have enough bandwidth to accommodate all the data. In this way, even when data are dropped, a basic level of image quality is still maintained.

A basic shortcoming of the two-layer approach is that there is no distinction between the relative importance of data within an ES stream and among the separate ES streams. In fact, given multiplexing at the boundary of the network, it is intuitively clear that it is better to drop data before the data have been packetized. This is because the relative importance of the data is known down to the last detail and the lowest significant data can be dropped. In this way, the two facts, namely, that: 1) within a video stream, not all data are equally important; and 2) between the video streams, some streams may require more bandwidth than the other streams at a particular moment in time, can be fully exploited to achieve fairness and smooth image quality among the video sequences.

To illustrate that it is better to drop data before packetization when dropping data is unavoidable due to restricted channel bandwidth, reference is made to FIG. 1. FIG. 1(a) illustrates a signal-to-noise (SNR) ratio plotted over the number of frames of an MPEG-coded video sequence in which there is no bandwidth restriction. FIG. 1(b) is the SNR of the same video sequence using the two-layer approach described above for multiplexing this sequence with seven other video sequences onto a bandwidth-restricted CBR output channel. FIG. 1(c) is the SNR of the same video sequence using an apparatus of the invention hereinafter explained to multiplex and compress data before packetization. The same CBR output channel is assumed. It can be seen that the SNR in FIG. 1(b) has degraded substantially relative to that in FIG. 1(a) but not so for the SNR in FIG. 1(c). The difference in quality in the actual visual images (not shown here) can also be observed easily.

DESCRIPTION OF THE PRIOR ART

The following patents were uncovered in a search which focussed on the subject invention among U.S. Patent and Trademark Office records:

U.S. Pat. No. 4,872,009: This patent relates to a method for data compression and restoration applicable to sequential file units. The focus is on the information from a single source. In the present inventor's disclosure, there is no need to address the restoration issue, since the need for restoration should be minimal.

U.S. Pat. No. 4,916,537: This patent relates to an image information signal transmitting system. The focus is on compression and transmission of information from a single source. Information is transmitted in units of blocks, a conventional concept.

U.S. Pat. No. 4,951,139: This patent relates to a computer-based video compression system. The compression process makes use of conventional approaches, such as segmentation, predictive coding, etc. The focus is on compression of information from a single source.

U.S. Pat. No. 4,963,030: This patent relates to a method for performing vector quantization in speech/image compression that claims to achieve lower bit rate and faster computation. It makes use of correlation among neighboring blocks of the same data source to achieve a higher compression ratio. This patent teaches away from the inventor's present invention, as explained below, since the invention works best when data are uncorrelated (e.g., when they are from different sources).

U.S. Pat. No. 5,198,940: This patent relates to an information recording system for recording information signal, and in particular, signal restoration when error occurs. The information is from a single source.

U.S. Pat. No. 5,218,650: The invention relates to a quantization method for use in image compression systems. The system uses a JPEG data format, which is similar to the MPEG data format.

U.S. Pat. No. 5,231,484: The invention relates to a method for implementing an encoder suitable for use with MPEG standards. This patent makes use of adaptive bit allocation to produce a fixed-rate compression data stream. A fixed number of bits is allocated to each picture (a frame in a video sequence), and the method employs adaptive quantization of DCT coefficients in different regions (e.g., different blocks) of the picture to "optimally" allocate the bits. The patent describes an alternative approach to achieving stable video quality over time. This patent addresses only the single-source scenario; the interactions between blocks of different sources are not obvious from the patent description. There is no knowledge of the relationship between the distortion level of that block and the number of bits allocated. Equalization of quality among blocks is not touched on in the patent. A certain number of bits is first determined for a picture, and then, given the number of bits, the blocks in the picture are then coded according to some quantization level in order to meet the bit allocation. However, there is no guarantee that the overall number of bits actually produced is exactly the targeted number. This patent aims at stabilizing the output bit rate of a single source by adaptively adjusting the quantization level according to some underlying algorithm.

U.S. Pat. No. 5,289,276: The invention relates to a protocol for segmenting compressed video data into cells (packets) for transmission so that a receiver can rapidly recover from occurrences of missing or corrupted data. The issue addressed is restoration.

U.S. Pat. No. 5,339,108: This invention makes use of the concept of ordering of the data from a source in writing the compressed data into a storage medium (or sending over a communication channel). When it is only possible to retrieve part of the information for reconstruction (decompression) at least a partial image can be reconstructed. In this sense, the patent makes use of the concept of loss-tolerant data sources. The patent also mentions ordering the DCT components starting from the low frequencies to the high frequencies.

What is needed is a technique for data compression which is optimized for variable bit rate (VBR) types of data, particularly multiplexed VBR data from several sources. It would be highly desirable that the multiplexed data as a whole is CBR so that transporting it over a communication network is straightforward, and that individually the data from a single source is VBR so as to achieve constant quality.

SUMMARY OF THE INVENTION

According to the invention, data as may be employed in telecommunication (or data storage) is segmented into blocks, each block having associated therewith a metric of distortion to represent the quality of the data contained in the block. Within the blocks, elements such as bits are ordered according to significance. The blocks are then ranked according to the distortion metric as a function of for example the number of bits in the block. In the course of for example multiplexing multiple sources and allocation of available bandwidth of a fixed bandwidth channel for variable bit rate (VBR) transmission of data from individual sources, the lowest significant bits of those blocks having the lowest distortion metrics are dropped and bandwidth is allocated to other blocks having the highest distortion metrics in order to redistribute the quality or distortion of each of the blocks for transmission (or subsequent compressed storage). Each of the blocks can thus be transmitted at substantially the same level of distortion within a channel which is bandwidth restricted compared to the maximum possible resolution of the data, thus minimizing imbalances in quality among the blocks of data and maximizing channel efficiency. A particular application of this data compression technique is in video data compression wherein each of the data blocks contains the coefficients of a discrete cosine transform, wherein the quality of the data actually needs to be substantially equal among all the blocks of data and wherein the data itself is loss-tolerant within each of the blocks of data. The invention has particular application in an MPEG block encoding and decoding scheme. A further application of this data compression technique is in the multiplexing of blocks of data from different images into a common channel for transmission.

In a specific implementation, blocks are collected, initially each block containing as many bits as is needed to make the distortion levels zero or close to zero, and then, a certain number of bits is allocated to the blocks as a whole. If the number of bits allocated is less than the total number of bits in the blocks, then some bits of the blocks must be dropped. The selection of bits to be discarded is preferably as follows: the blocks are ranked according to the distortion metric, then the lowest significant bits of the block having the lowest distortion metrics are dropped. This process is repeated, each time some bits of a block are chosen to be dropped, resulting in a new distortion level for the block, until the total number of bits of the blocks is no more than the allocated number of bits. Each of the blocks can thus be transmitted (or stored) with substantially the same level of distortion within a channel (or storage medium) which is bandwidth restricted compared to the maximum possible resolution of the data, thus minimizing imbalances in quality among the blocks of data and maximizing channel efficiency.

A particular application of this data compression technique is in video data compression wherein each of the data blocks contains the coefficients of a discrete cosine transform, wherein the coefficients of lower spatial frequencies are considered more significant than those of higher spatial frequencies, and wherein the quality of the data actually needs to be substantially equal among all the blocks of data and wherein the data itself is loss-tolerant within each of the blocks of data in that the higher-frequency coefficients can be dropped if necessary with only gradual degradation in image quality. The invention has particular application in an MPEG block encoding and decoding scheme. A further application of this data compression technique is in the multiplexing of blocks of data from different images into a common channel for transmission.

In the case where VBR data is to be multiplexed, variations of bit rate and image quality can be reduced in the case of the transmission of a video bundle consisting of a number of video streams multiplexed together. In this situation, the user may acquire a single CBR channel from the network operator and performs multiplexing of the video streams on its own at the edge of the network. The CBR nature of the channel allows the network to control and manage it in a straightforward manner, making it simple to eliminate the data loss in the network due to traffic congestion.

In a particular telecommunications application, a contract between a network provider and the subscriber/user may be simple: the network is required to guarantee the delivery of all packets or cells.

The invention may be viewed as relating to the "integrated" compression of multiple blocks of data that are loss tolerant. In particular, in scenarios where the blocks of data represent different regions of images from disparate and uncorrelated video programs, a fixed number of bits is allocated to the blocks of data as a whole. For a given image quality, different blocks of data may demand different numbers of bits. For each block, it is assumed that a function can be computed or estimated which relates the distortion level (image quality) and the number of bits allocated to it. To achieve fairness and uniform quality among the blocks, bits are allocated to individual blocks according to their demands; however, the number of bits allocated to the blocks is not independent and is not equal in number, so as to equalize the distortion level of all blocks. This concept of "bandwidth sharing" allows achievement of a constant image quality for each of the video programs over time. In addition, since as a whole the video programs have a constant aggregated output bit rate, the transport of the video programs over a broadband communications network is straightforward.

In contrast to many typical single-source compression schemes, where correlation among blocks (of the same image or video source) allows compression of information by the method of redundancy removal (predictive coding), the "bandwidth sharing" concept herein proposal works best when the blocks are uncorrelated (e.g., when they are from different sources), so that blocks that demand a large number of bits may "borrow" bits from blocks that demand a small number of bits.

The invention will be better understood upon reference to the following detailed description in connection with the accompanying drawings.

DESCRIPTION OF SPECIFIC EMBODIMENTS

This invention is explained in the context of video data compression. It is assumed that the data has been prepared in blocks, with the bits sorted according to significance. This type of data organization is inherent in MPEG encoding, where each block of data is representative of the coefficients of a single discrete cosine transform (DCT) for each block, each block representing a region at a defined position of a single frame of an image. However, the encoding is often based on a relationship with a previous frame at the same region in the image. This may be referred to as interframe coding.

Throughout this document, it should be understood that in many encoding schemes, it is often necessary to treat a group of bits within a block as a single entity which must be either retained or dropped together. That is, it is not possible to drop some bits of the group while retaining the other bits. For example, in a DCT block, there are typically several codewords consisting of varying numbers of bits. Each codeword represents a number of frequency components that have zero-value coefficients followed by one frequency component with a non-zero coefficient. This is commonly referred to as runlength encoding. It may be desirable for the sake of simplicity to treat each codeword as an "atomic" entity that cannot be further subdivided. Thus, when referring to "dropping" or "retaining" bits in the following, it is implicit that this includes situations in which the actual entities being dropped or retained are codewords rather that individual bits.

Figure 1A:
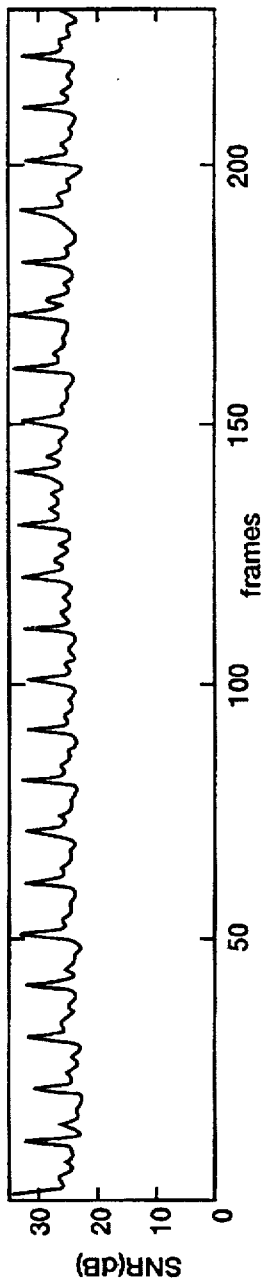
FIGS. 1A, 1B and 1C are graphs of signal-to-noise ratios of uncompressed and compressed MPEG sequences.
Figure 1B:
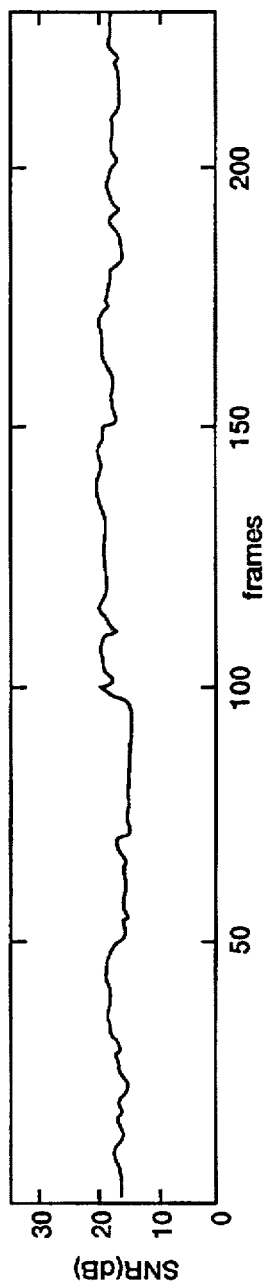
Figure 1C:
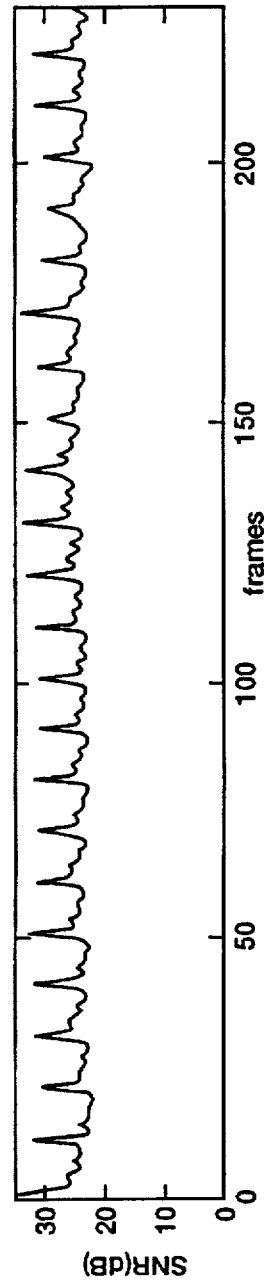
Figure 2:
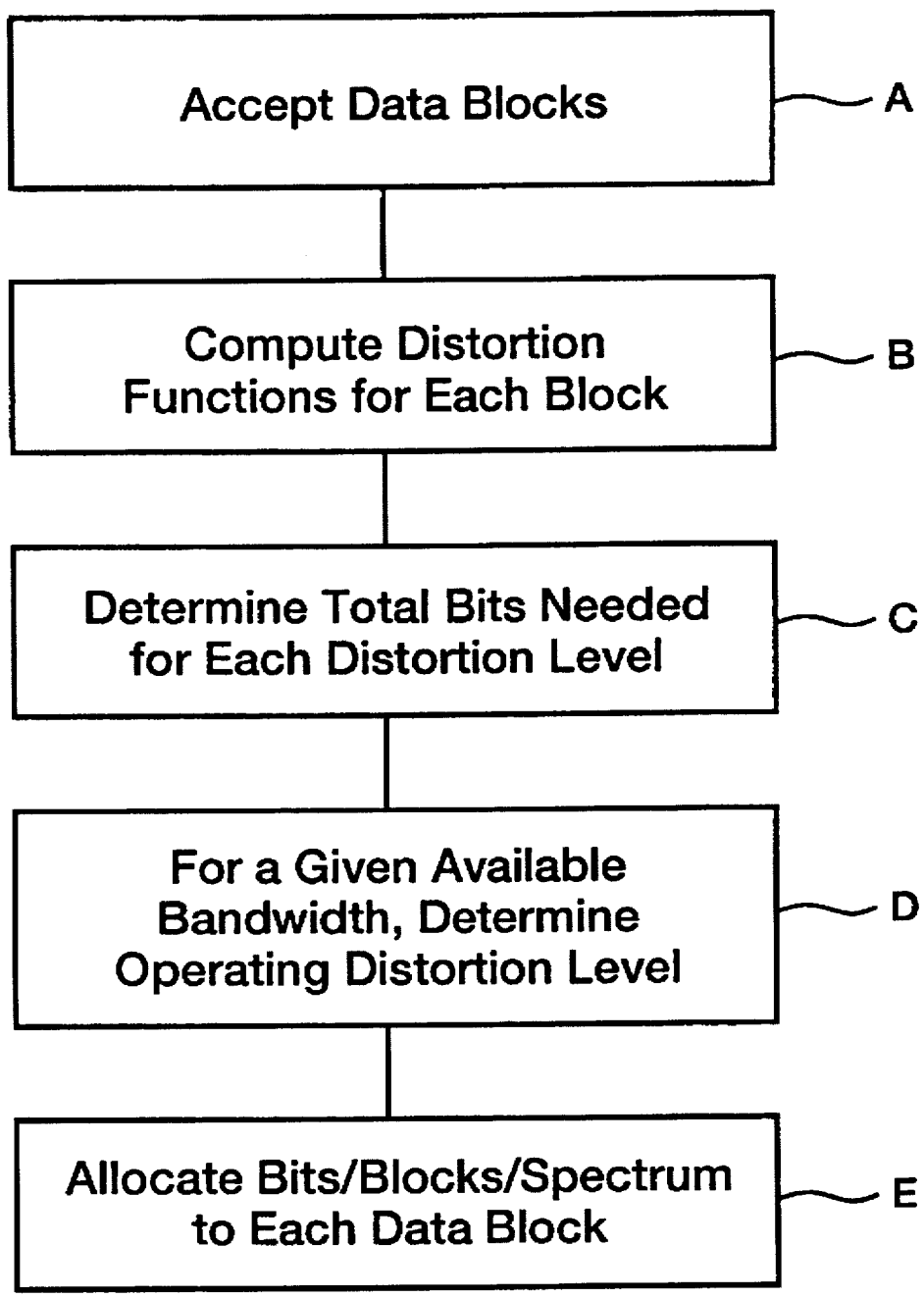
FIG. 2 is a flow chart of an illustrative method according to the invention.

Referring to FIG. 2, there is shown a flow chart of an exemplary method according to the invention. First, a number of data blocks from a single frame of an image or even from a plurality of frames from one or several images (if more than one data stream is to be processed) is accepted into a processor (Step A). Thereupon, a distortion function is computed for each block as a function of the number of bits retained in the block (Step B). There are many possible ways of defining and calculating the distortion functions. The next few paragraphs gives some specific examples, which by no means limit the scope of this invention. In general, any measure that relates to image quality can be adopted. The optimal measure may be a subjective choice based on the designer's experimentation.

The following examples assume DCT-coded data blocks. In the "frequency-plane" approach, a coefficient (frequency component) of the DCT in a block is either dropped or retained as a single entity. Typically, for each data block high frequency components are dropped before the low frequency components. The distortion function is for example the energy of the signal dropped, which is the sum of square of dropped coefficients (frequency components) of the DCT. Alternatively, it could be the energy dropped divided by the total original energy of the block, which is the sum of the square of all coefficients.

It should be noted that when interframe coding is used with either of the above approaches, for an interframe-coded block, the DCT coefficients are "corrections" with reference to some other previously received frames at the decoder. The actual value of a coefficient should be its correction plus the reference value. The total original energy in a block (the denominator in the division described above) is not simply the sum of the square of all the values of the coefficients. Rather, the reference value should be added back to the coefficient values before the sum and square are taken. As for the total dropped energy, it is still the sum of squares of all the dropped "corrections".

Where D is a measure of distortion and B is the number of bits, the process in Step B yields the following dataset: B1(D), B2(D), . . . , BN(D) in datablock "i", which yields the number of bits retained as a function of distortion level.

FIG. 2 and the next few paragraphs assume that the same (or roughly the same) distortion is to be achieved for all blocks. This patent intends to include cases where other criteria are adopted, as will be explained hereinafter. For each D value, all B values in i are summed to obtain the total number of bits BT needed at a particular chosen level of distortion (FIG. 2, Step C). Considering all D values, BT as a function of D, BT(D), has thus been obtained.

The available constant bandwidth B' is a preselected or given parameter and the total number of bits used by the blocks BT should not exceed it. By setting BT(D)=B', the targeted distortion value D' for each of the blocks can be found (Step D). Based on D', the values of B1(D'), B2(D'), . . . , BN(D') are derived. Hence B1(D'), B2(D'), . . . , BN(D') are allocated to each of the blocks (Step E). B1 is the number of bits allocated to Block 1, B2 is the number of bits allocated to Block 2, etc., to achieve substantially uniform distortion D' for all the blocks. Thus for each datablock, the number of bits that will be retained, used, stored or transmitted from the total bits available for each datablock is the value "Bj" at which Dj=D'. If the bits are ordered by significance, the processor merely needs to truncate the datablock at the selected value B for each source.

Figure 3:
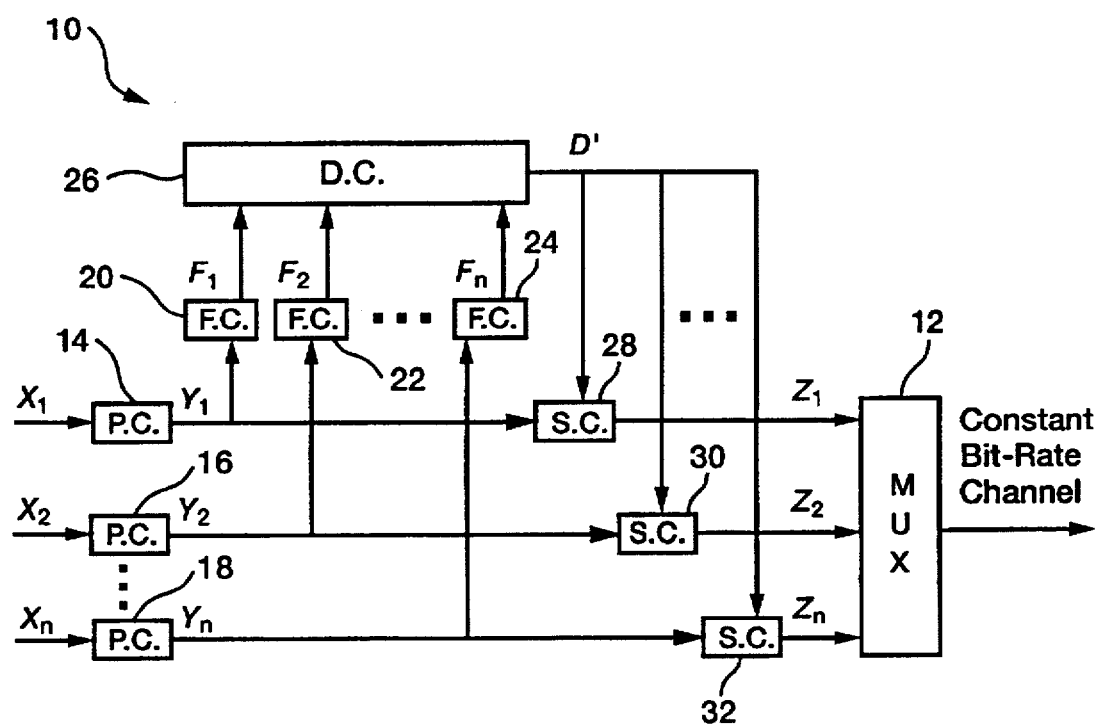
FIG. 3 is a block diagram of an apparatus for carrying out a method according to the invention.

FIG. 3 is a block diagram of an apparatus 10 operative according to the inventive method. It comprises compressors and a multiplexer 12. A stream of blocks of uncompressed data X on input channels 1,2, . . . , n are coupled to a corresponding Preliminary Compressor 14, 16, 18 which generates intermediate compressed data blocks Y on intermediate channels 1, 2, . . . , n. The form of precompression is typically a form of the conventional discrete cosine transform, such as in MPEG coding, but it need not be so limited. Although FIG. 3 depicts data blocks Y as being forwarded to other functional blocks immediately, as hereinafter explained, the data blocks Y may be stored in storage media and retrieved later for subsequent processing.

Figure 4A:
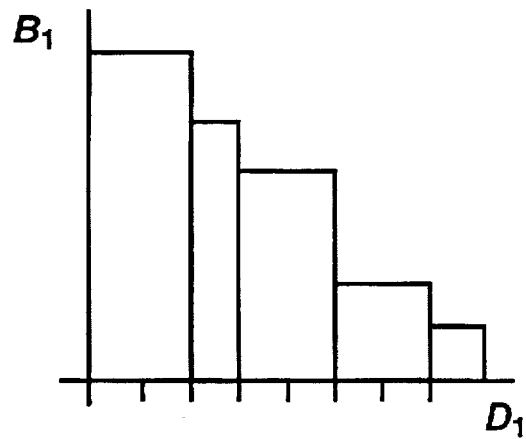
FIGS. 4A, 4B and 4C are graphs of bit rate vs. distortion in source and output datastreams in a method according to the invention.
Figure 4B:
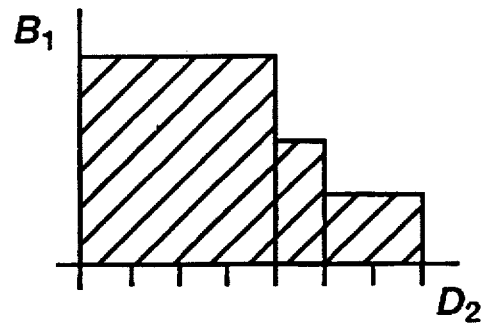

Each intermediate channel is tapped through a bits-versus-distortion-functions calculator 20, 22, 24, the outputs of which each produce a set bits-versus-distortion functions F from the corresponding source. Note that since a number of blocks may be taken from each source for processing, F may contain a number of bits-versus-distortion functions, B(D), one for each block taken from the source. For illustration, FIGS. 4A and 4B sketch two typical bit-versus-distortion functions in the case of MPEG precompression with the frequency-plane approach (see above) where each codeword dropped or retained represents a number of zero-valued coefficients followed by one non-zero coefficient. The following pseudo-code specifies more precisely the computation performed by a bits-versus-distortion functions calculator, assuming the frequency-plane approach. It should be understood that other variations are possible without deviating from the spirit of this invention.

---

Pseudo-code 1
For each input block, perform the following:
  Comment: In the following, C is the set of
    codewords, C1, C2, . . . , CM, of the DCT data
    block. Ci is less significant than Cj if
    i < j. In the frequency-plane approach, Ci is
    less significant than Cj if the
    nonzero-coefficient frequency component in Ci
    is of a higher frequency than that in Cj.
  Ei is the energy of the codeword Ci (i.e., the
    square of the coefficients of the frequency
    components represented by Ci).
  Gi is the number of bits in Ci.
  H is the data structure used to store
    information about the bit-versus-distortion
    function; it is a set of ordered pairs; e.g.,
    H = { (0.00,100),(0.10,50),(0.50,30),(1.00,0)}
    means distortion of 0.00 can be achieved with
    100 bits, distortion of 0.10 can be achieved
    with 50 bits, distortion of 0.5 can be
    achieved with 30 bits, and distortion of 1.00
    can be achieved with 0 bits. In general, a
    block with M codewords has (M+1) ordered pairs
    in its H. Different blocks may have different
    numbers of codewords.
  Delta = resolution for the distortion level
    (see Pseudo-code 2 for its implication for

```
        computation complexity and precision).
Begin
  Comment: Initialization
  H = empty set;
  For k from 1 to M, compute Ek;
  ET = E1 + E2 + ... + EM;
  EC = ET;
  GC = G1 + G2 + ... + GM;
  H = H + (0.00, GC);
     Comment: "+" is the set union operation.
     Comment: Compute H.
  For k from 1 to M, perform
     Begin
        EC = EC - Ek;
        GC = GC - Gk;
        D = (ET - EC)/ ET;
        Comment: D is a temporary stage for distortion
           level if Cl up to Ck are dropped.
        H = H + ( NEXT(D), GC );
        Comment: NEXT(D) is a value
              V ( D <= V < D + Delta)
              which is the smallest multiple of Delta
              larger than or equal to D.
              For example, if Delta = 0.10, D = 0.33,
              then V = 0.4. This is done so that
              the number of different possible values
              for V is limited so as to simplify
              computation in Pseudo-code 2.
              Thus, for a given V, the actual
              distortion levelD could be anywhere
              between V - Delta and V (more precisely,
              V - Delta < D <= V)
     End
End
```

Figure 4C:
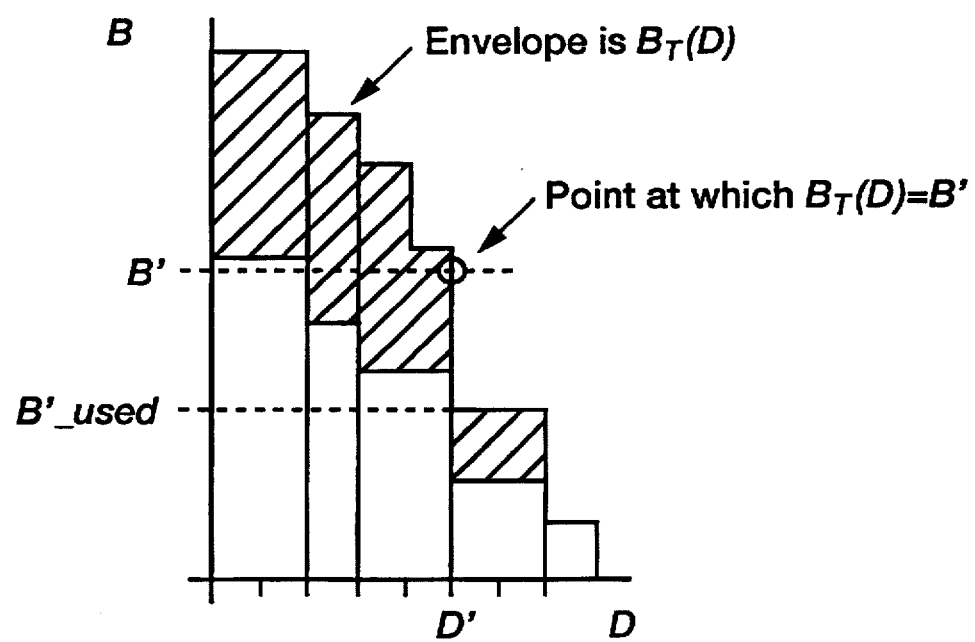

The outputs of the bits-versus-functions calculator 20, 22, 24 are fed to a target-distortion-level calculator 26, in which the processes described in connection with FIG. 3 are carried out to produce a target distortion level value D'. FIG. 4C illustrates graphically the process performed by calculator 26 and the corresponding resulting D' assuming there are only two bit-versus-distortion functions.

The following is an example of pseudo-code:

```
Pseudo-Code 2
Comment: Delta = resolution of the distortion level;
         smaller Delta value corresponds to
         more precise computation and bit allocation,
         but higher computation time.
         B' = total number of allocated bits.
         Each F in Fig. 4(A) contains one of more
         H as computed from Pseudo-code 1.
         This code assumes there are N blocks
            altogether. Correspondingly, there are
            N H's: H1, H2, ... HN in
            F1, F2, ... Fn altogether.
         The following computes BT(D) with
            resolution of Delta in D based on H's,
            and then determines D' based on B'.
         Oi is a temporary storage containing
            an ordered pair (Di, Bi ) from Hi.
Begin
  Comment: Initialization and compute BT(0).
  D = 0.0;
  Set BT(D) = 0 for all D from 0 to 1;
  Comment: Calculate the number of bits needed to
              have zero distortion for all blocks.
  For k from 1 to N, perform
     Begin
        Remove the ordered pair with the D value=0.0
           from Hk and set Ok = (Dk, Bk) to this ordered
           pair;
        Bk_used = Bk;
        BT(D) = BT(D) + Bk_used;
        Remove the ordered pair with the smallest
           D value from Hk and set Ok equal to it;
     End
  Comment: The following computes BT(D) iteratively
              starting from small D to large D.
  Begin
     While (D not = 1), perform
        Begin
           D = D + Delta;
           For k from 1 to N
              If ( Dk = D) perform
                 Begin
                    Bk_used = Bk;
                    If (Dk not = 1), remove the ordered pair with
                       the smallest D value from Hk and set Ok equal
                       to it.
                 End
              For k from 1 to N
                 BT(D) = BT(D) + Bk_used;
           End
        End
     Comment: The following identify the D' value;
                 note that this identification could have been
                 integrated with the above procedure for
                 calculating BT(D) so that the computation of
                 BT(D) could be stopped as soon as D' is
                 identified so as to save computation.
     D = 1.0;
     While ((BT(D) > B') and (D not = 0.0)
        D = D - Delta;
     D' = D;
     End
```

The target distortion level D' is the control value used in a series of second level compressors 28, 30, 32 on each of the intermediate channels Y. The second level compressors 28, 30, 32 cause lower significance data to be dropped from selected channels of Y, which is necessary to achieve the imposed distortion level D'. The resultant distorted data are in the form of truncated digital blocks Z, all of which are fed on channels 1,2, ..., n to the multiplexer 12. The output of the multiplexer 12 is a digital data stream of blocks on a constant bit-rate channel in accordance with the invention.

With reference to FIG. 4C, it should be noted that the discrete nature of the codewords and the fact that a codeword is either dropped or retained in its entirety implies that the BT(D) function calculated is a function consisting of steps. This further implies that the D' value determined according to Pseudo-code 2 may leave some of the allocated bits B' unused if all blocks are set to have D=D'. For instance, FIG. 4C shows that with D=D' for the two blocks, the actual number of bits used is B'_ used. The residual number of unused bits is B'—B'_ used. Although by definition of the procedure, it is not possible to include one more codeword from every block, it might be possible to assign these residual bits to one of the two blocks and include one or more codewords from it if the residual number of bits is sufficiently large. In general, with more than two blocks, the assignment of residual bits to some of the blocks gives rise to lower distortion levels than D' for those blocks. For all blocks, however, the distortion level is no more than D'. There are many assignment heuristics that are reasonable for the residual bits. These heuristics represent fine tuning of the invention and will not be further discussed. Note that when different blocks can have different D' values as above, it should be understood that in FIG. 3, the D' values conveyed to different S.C.'s can be different.

For simple explanation, FIG. 3 has drawn the functional blocks of F.C., D.C., and S.C. as separate entities. In actual implementation, F.C., D.C., S.C., and the multiplexer 12 might be integrated to streamline their operations. This way, for instance, for a given D', it is not necessary for the S.C.

to re-calculate which codewords should be dropped or retained, since this information is implicit from the calculation already performed by the corresponding F.C. 20, 22 or 24.

There are other procedures for achieving uniform or substantially uniform distortions among the data blocks. For instance, instead of calculating the bits-versus-distortion functions explicitly before deciding the codewords to be dropped, this procedure can be used:

Alternative Procedure

1) Initially, all the blocks contain all their codewords and their distortion levels are 0.
2) If the B' is not large enough to retain all the codewords perform 3), otherwise terminate.
3) Choose the block with the lowest distortion level among all blocks. Drop the least significant codeword from it, recalculate the new distortion level for it. Go to 2).

The main spirit of the invention has been explained above. Several variations and extensions which might not be immediately obvious are described in the following subsections.

Other Distortion Objectives

The discussion so far has focused on achieving uniform or substantially uniform distortion levels among all blocks. It is conceivable that other objectives are also reasonable. For instance, some blocks may be from "premium" video programs which demand higher image quality. Instead of D', these blocks may have a lower target distortion level of, say, 0.5 D'. This means some bits from the "non-premium" blocks must be "given" to these premium blocks in order to satisfy the constant bit constraint B'. Yet another reasonable objective might be to minimize the sum of the distortion levels of the blocks, D1+D2+ . . . +DN. In general, there is an infinite number of possible distortion objectives.

Figure 5A:
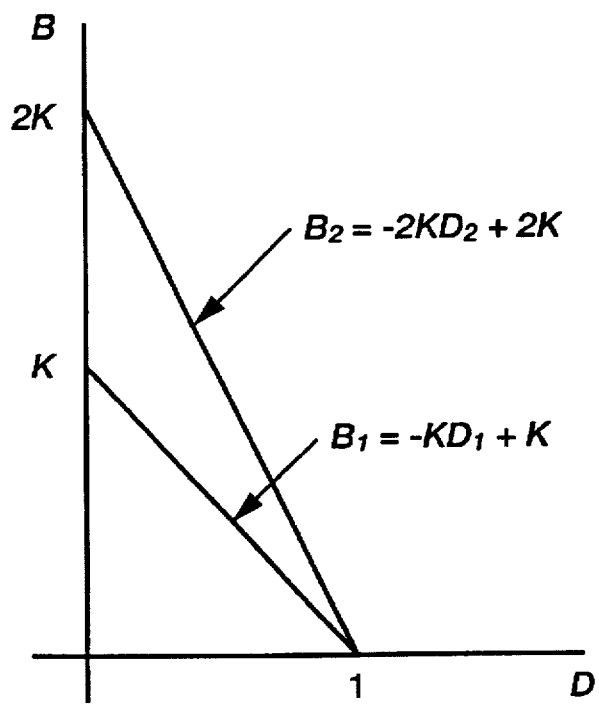
FIGS. 5A and 5B are graphs illustrating achievable distortion regions.
Figure 5B:
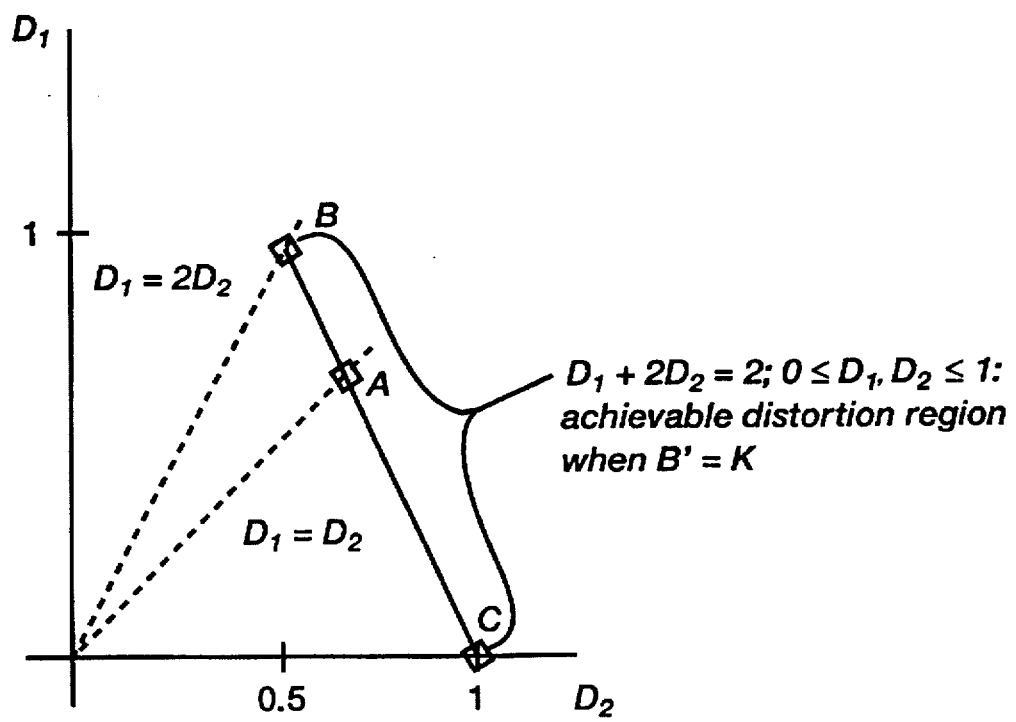

Instead of particular distortion objectives, the more fundamental concept is that of a "achievable distortion region". FIGS. 5A and 5B depict a hypothetical situation with just two blocks where the discrete nature of the bits to be dropped and the distortion levels have been ignored to simplify explanation. The extension to more than two blocks is straightforward.

Suppose that blocks 1 and 2 have bits-versus-distortion objectives of B1(D1) and B2(D2), as indicated, and that B' bits are allocated to them as a whole. Then, the achievable distortion region is given by B1(D1)+B2(D2)=B'. Thus, we may allocate bits to block 1 to make D1 lower at the expense of a smaller B2 and a higher D2, and vice versa. In the hypothetical scenario of FIG. 5A and 5B, both B1 and B2 are linear in D: B1=−K D1+K and B2=−2K D2+2K, for some constant K, and:

$$0<=D1,D2,<=1,$$

as illustrated in FIG. 5A. The associated achievable region when B'=B1+B2=K is given by $$D1+2D2=2; 0<=D1,D2<=1,$$

and it is depicted in FIG. 5B. In FIG. 5B, point A is the operating point if the objective is D1=D2. Point B is the operating point if the objective is D1=2 D2. Point C is the operating point if the objective is to minimize D1+D2. It is obvious that once the achievable distortion region has been computed, different distortion objectives can be achieved with respect to the achievable distortion region.

With reference to FIG. 3, the D' values typically fed to the secondary compressor 30, 32 of different blocks may be different when the distortion objective is not to uniformize all the blocks' distortion level.

Pre-allocation of Some Bits, Codewords or Frequencies

Out of B' bits, a certain number of bits B__min can be pre-allocated to every block. This may be for the purpose of reducing the processing time, or simply to prevent extremely uneven allocation of bits to the blocks. For each block, the following procedure is performed:

Procedure 1

For block i:

1) Compute the maximum number of codewords that can be retained given the number of bits should be no more than B__min bits.
2) Compute the actual number of bits used Bi__min, determine the set of codewords that has not been retained (the rest has now been pre-determined to be retainable), compute the distortion level Di__max if all these codewords were to be dropped Di.

After Procedure 1 has been performed for every block, the following procedure is performed with all blocks together:

Procedure 2

1) Compute the remaining number of bits left, B", by subtracting from B' the numbers of bits already used by the blocks in procedure 1.
   That is, B"=B'−B1__min−B2__min− . . . −BN__min.
2) Perform the procedures as outlined in pseudo-codes 1 and 2 or the Alternative Procedure by noting the following modifications:
   (a) Set B' over there to B" here.
   (b) Set the set of codewords in each block over there to the set of codewords that has not been selected in Procedure 1 above.
   (c) Set the upper bound of distortion level for block i to Di__max, as opposed to 1.0 in Pseudo-code 2.
   (d) In Step 3) of the Alternative Procedure, rather than choosing the block with the lowest distortion level, the block with the lowest distortion level such that this distortion level is also smaller than its Di__max should be chosen;

otherwise, one may not find any remaining codeword in the block to be dropped because the rest of the codewords have been pre-selected by Procedure 1.

Because of the pre-allocation of bits, the actual distortion level for a block i thus determined may not be D', the supposedly common distortion level for all blocks. It is either D' (if D'<Di__max) or Di__max (if D'>=Di__max).

It is a straightforward extension to pre-allocate codewords where one has pre-allocated bits. That is, instead of pre-allocating B__min bits to every block, a certain number of most significant codewords can be pre-selected from every block and the rest subject to the compression process described above.

The third alternative is to pre-select all frequency components below a certain maximum frequency. In MPEG encoding, each codeword represents a variable number of DCT spatial-frequency components that have zero-valued coefficients followed by one with nonzero-valued coefficients. Accordingly, one can pre-select all the those codewords whose nonzero coefficients are associated with frequencies smaller than the maximum frequency.

Interframe/Interpolative Coding

The descriptions so far have focussed on the integrated compression of a group of blocks at a particular moment in time. In practice, each data source may continuously output blocks. For a video source, the blocks in a frame of picture are often correlated to blocks in frames of earlier and later times. This correlation is often used to reduce the number of bits required to code the frame. In interframe coding, for instance, the content of a block of the current frame is subtracted from a block of the previous frame before it is encoded. The previous frame is said to be the reference frame. In interpolative coding, both previous and future frames are used as the reference frames to reduce the number of bits required for the current frame. In typical video compression schemes, some frames in a video are intraframe coded (without referring to any other frames), some are interframe coded, and some are interpolatively coded.

Figure 6:
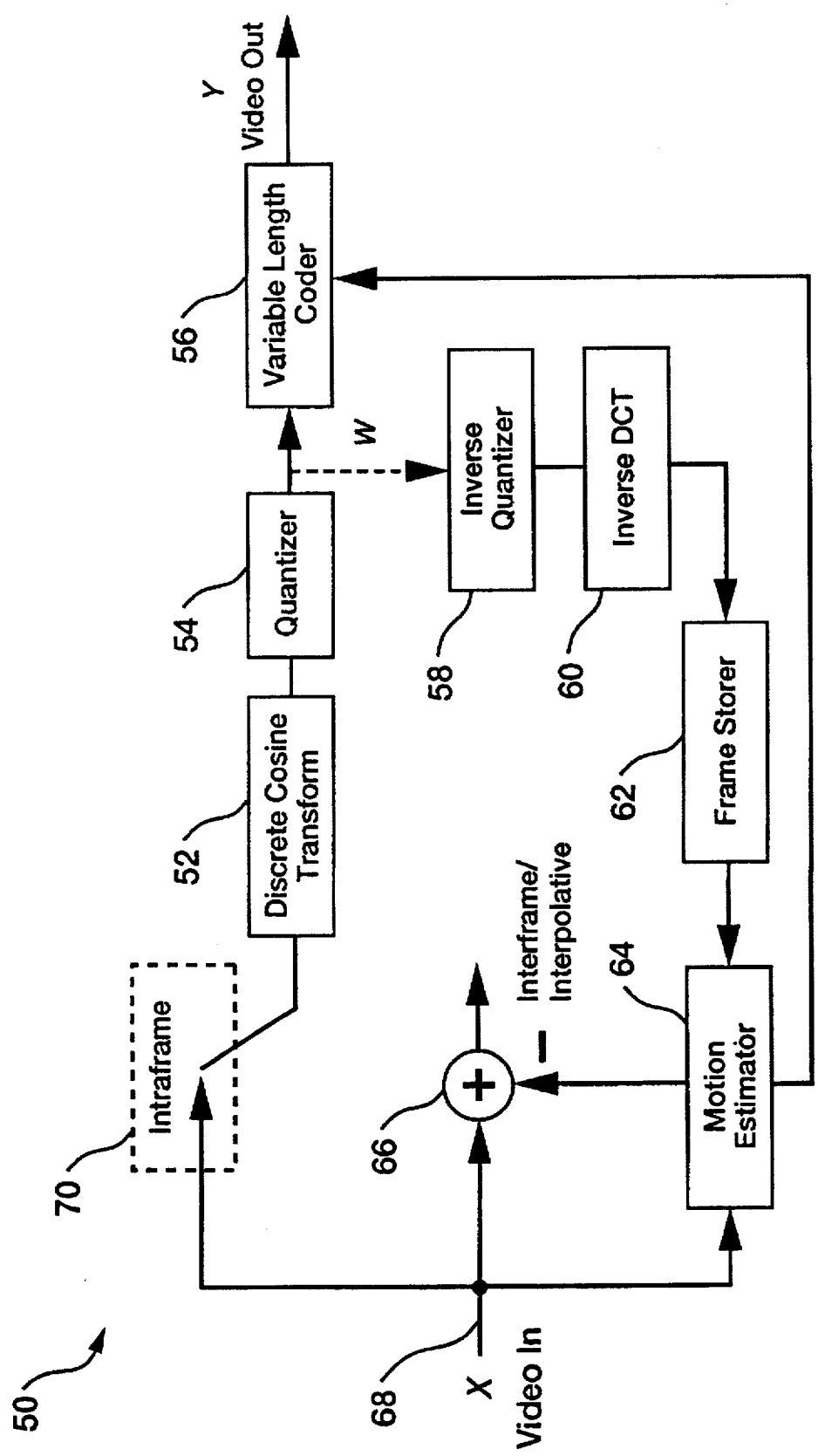
FIG. 6 is a block diagram of a (prior art) device for performing MPEG encoding.

FIG. 6 shows the structure of an MPEG coder 50 employing a Discrete Cosine Transform (DCT) processor 52 driving a quantizer 54, in turn outputting data to a variable length coder (VLC) 56 and in feedback, via an inverse quantizer 58 and an inverse DCT processor 60, to a frame storer 62 the output of which is used by a motion estimator 64 to control negative feedback of a frame "summer" 66 and to control the VLC 56. Video in 68 is fed to the motion estimator 64, the summer 66 and an intraframe sampler 70, which supplies the data to the DCT 52. The detailed descriptions of the functional blocks can be found in the reference: P. Pancha and M. El. Zarki, "MPEG Coding for Variable Bit Rate Video Transmission," *IEEE Communications Magazine*, May 1994. The discussion here focuses on the implications of interframe/interpolative coding for the compression scheme of this invention.

The MPEG coder in FIG. 6 can be used as a preliminary compressor in the device 10 of FIG. 3. Thus, the output of the MPEG encoder 50, Y, is input to an F.C. 20 and an S.C. 28 in FIG. 3.

In FIG. 6, the input to the DCT processor 52 can be connected from one of two lines, depending on whether intraframe or interframe/interpolative encoding is adopted for the current frame. If interframe/interpolative encoding is used, some reference information (based on other frames) is first subtracted from the input X (68) before the input reaches the DCT processor 52. The dashed arrow in FIG. 6 represents a feedback path for the current frame information, W, so that other frames can make use of W for interframe/interpolative encoding in the future.

When the output Y is fed to the secondary compressor 10 in FIG. 3, some information in Y may be dropped in the compression process therein. Thus, the actual information transmitted to a decoder may be different from that represented by the value W. This will give rise to a discrepancy between the information stored as reference in the encoder and the decoder, resulting in decoding error of interframe/interpolative coded pictures.

Three approaches are described below to deal with this problem:

(i) Ignore the encoding/decoding discrepancy

This is the simplest approach. The same W as given in FIG. 6 will be used for the reference for encoding. A possibly different data set may be used as the reference by the decoder. This approach is acceptable when the decoding error due to the discrepancy is negligible.

(ii) Feedback only data actually sent to the decoder

Figure 7:
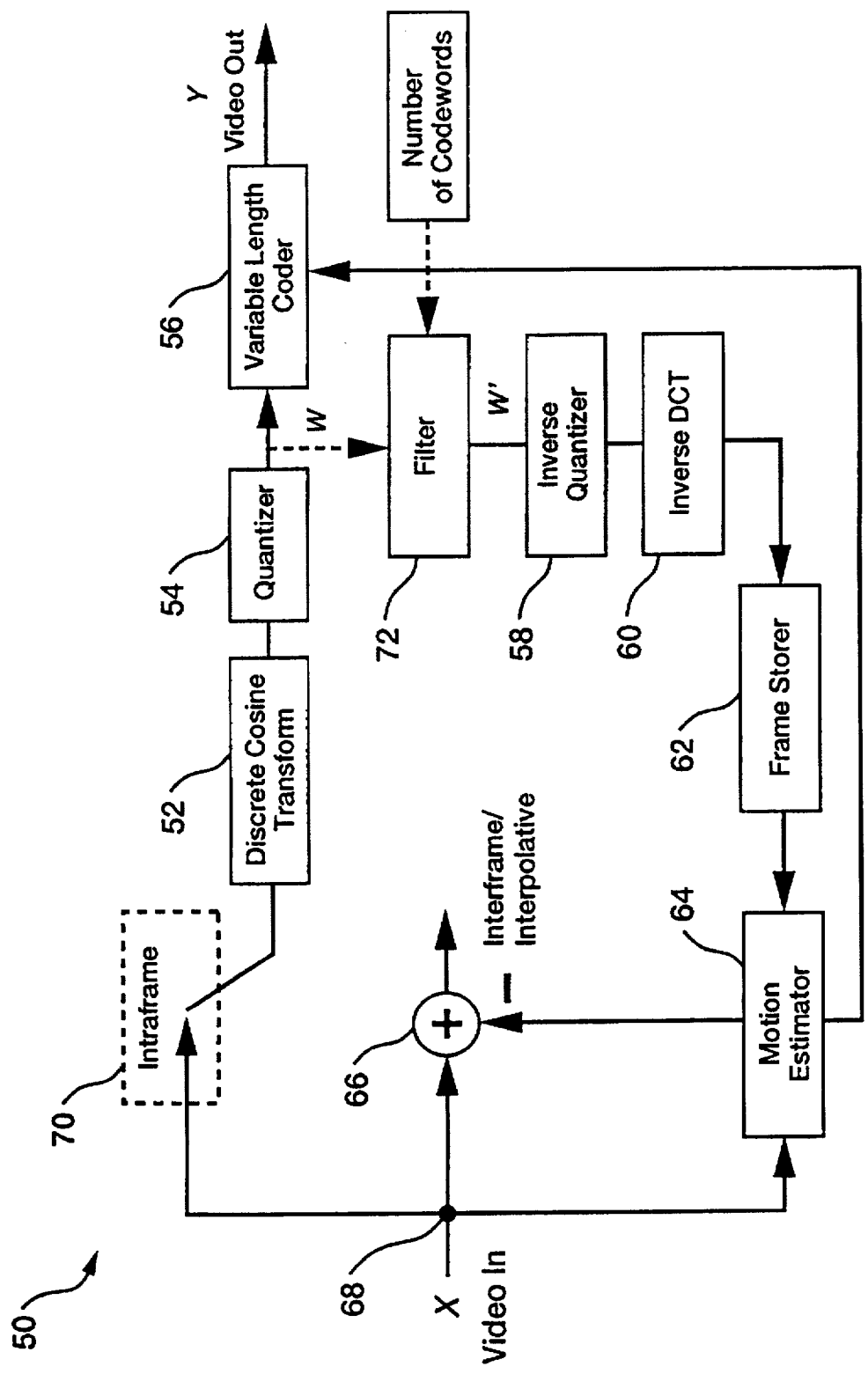
FIG. 7 is a block diagram of a device for performing MPEG encoding adapted according to the invention.

This approach is illustrated in FIG. 7. The F.C. or S.C. in FIG. 6 sends a signal NC back to the MPEG encoder indicating the number of codewords actually retained in each block after the secondary compression has been performed. A filter 72 then filters out information in W that has not been retained. In FIG. 7, W' is the post-filtered data, and it will be used as the reference for future interframe/interpolative encoding. In this way, there will be no discrepancy between the encoder and the decoder, and the decoding error mentioned will be eliminated entirely.

(iii) Feedback only preallocated codewords or frequency components.

With reference to the preceding subsection, the secondary compression may preallocate a number of codeword or frequency components to every block. In other words, these codewords and frequencies are guaranteed to be retained in the secondary compression, and this is known a priori (before the secondary compression). Correspondingly, instead of a feedback signal, NC could be pre-fixed, as shown in FIG. 7, and only data that is guaranteed to be selected in the secondary compression process is used as the reference for future interframe/interpolative coding.

With this approach, only part of the actually retained data is used as the reference.

Integration of Preliminary and Secondary Compression

The descriptions so far have separated the compression process into two independent/weakly-dependent processes: preliminary compression followed by secondary compression. In practice, the two processes may be integrated: 1) to streamline the operations of the two processes; or 2) to have only one inseparable compression process.

It is the intention herein to include these possibilities. There are many ways in which the two processes can be streamlined when combined. Nevertheless, the basic concept is the same as what has been described and will not be further discussed.

Figure 8:
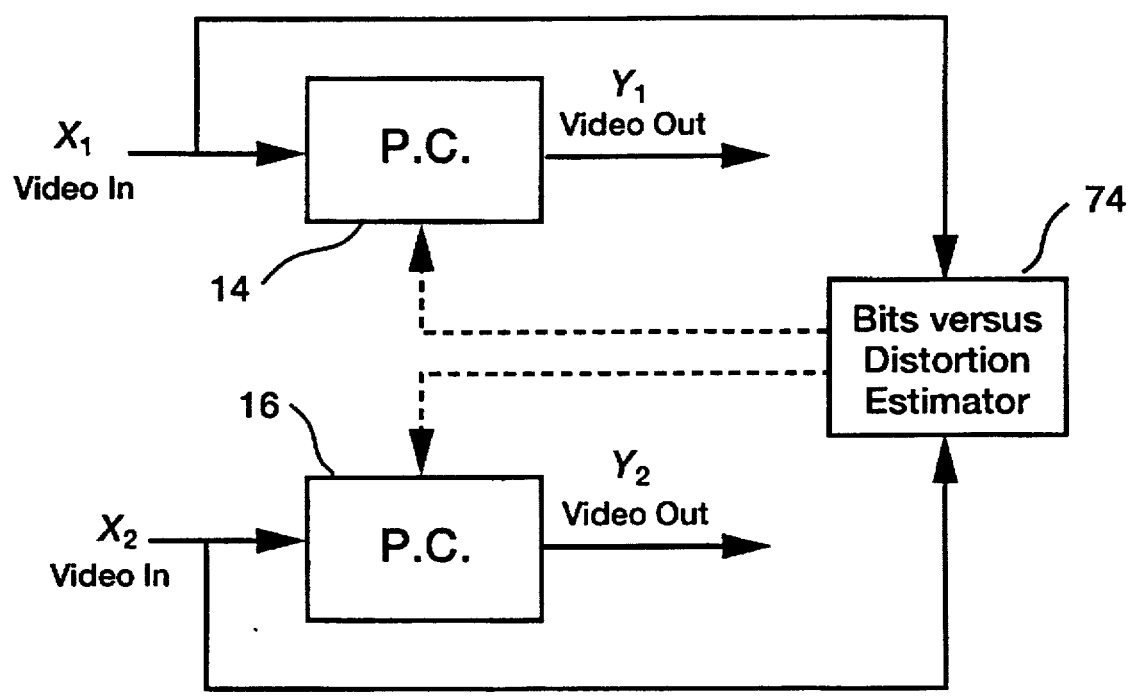
FIG. 8 is a block diagram of a configuration including a bit-versus-distortion estimator.

When only one compression process is to be performed, instead of computing the bits-versus-distortion functions exactly as in FIG. 3, the functions need to be estimated based on the input data. The idea is illustrated in FIG. 8, assuming two blocks to be compressed in an integrated manner. Based on the input data from all blocks, a bits-versus-distortion estimator (BDE) 74, coupled to receive at least two input data streams X1 and X2, which also feed preliminary compressors 14, 16, estimates the aggregated bits-verses-distortion function BT(D). This estimate is then used to set D' the targeted distortion level, according to the procedures in Pseudo-codes 1 and 2. The BDE 74 then sends signals to the compressors of the blocks to convey some coding parameters. For instance, these signals could contain the quantization factors to be used in the quantization functional blocks in MPEG encoders. The output Y from the compressors 14, 16 (FIG. 8), will not be further compressed.

Since the bits-versus-distortion function is only an estimate, it can turn out that the total number of bits output from the compressors are more or less than the estimated number of bits needed. Therefore, the number of output bits can vary from time to time. A buffer (see next subsection) can be used to smooth out this bit variation.

Dynamically Varying B'

The discussion so far has focussed on the sharing of bandwidth in "space": bits are shared among a group of data blocks. For real-time data, such as video, each source presents a continuous stream of incoming blocks to the compressor. Thus, as time progresses, different groups of blocks will be presented for compression. Sharing of bandwidth in "time" is possible by varying the allocated number of bits B' among the different groups of blocks in time, so that groups of blocks that need more bits are given a higher B' and groups of blocks that need fewer bits are given a lower B'.

Figure 9:
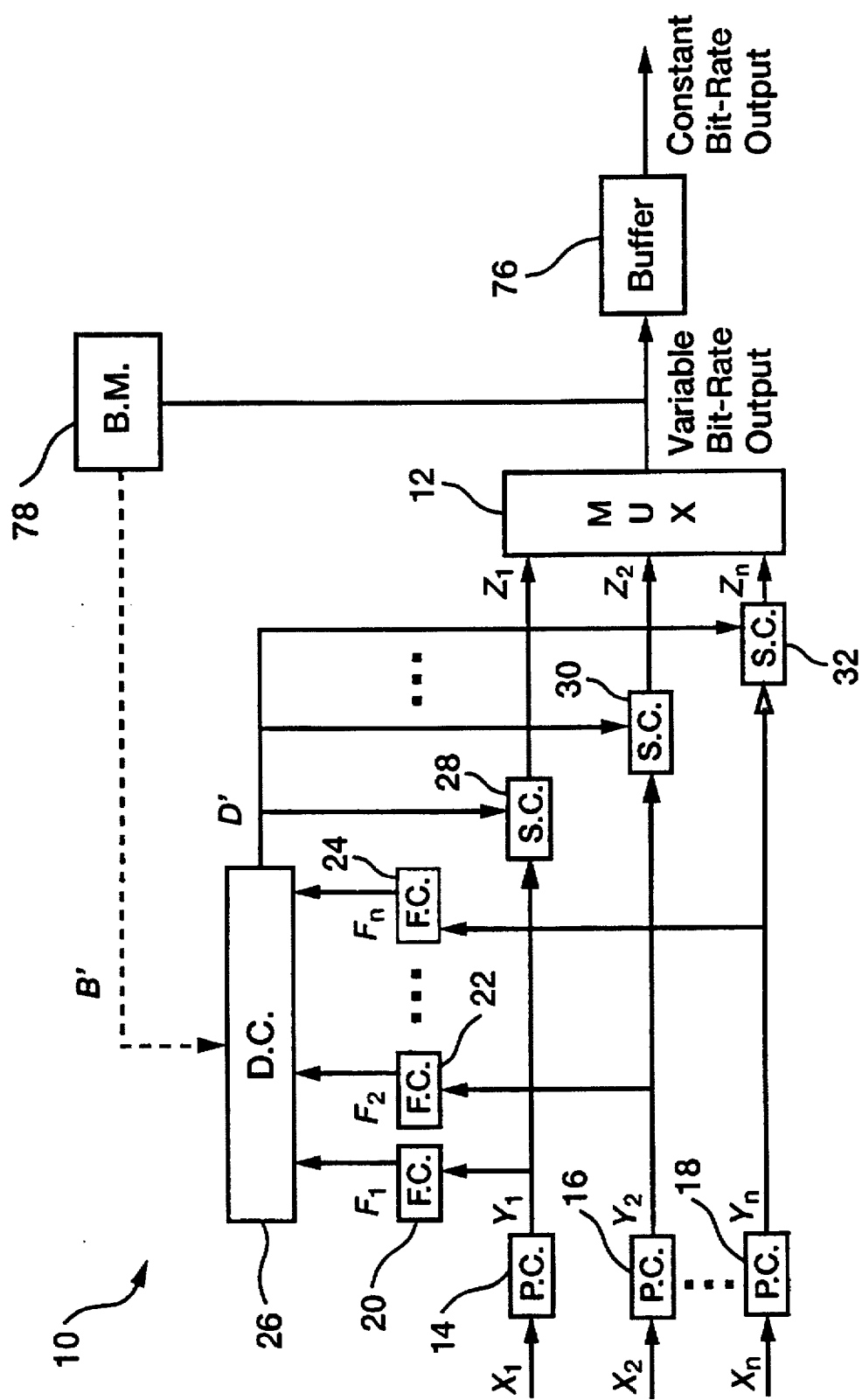
FIG. 9 is a block diagram of an apparatus for carrying out a method according to the invention, including a bits monitor.

A possible scheme is illustrated in connection with the apparatus with FIG. 9. In addition to the apparatus in FIG. 3, two functional blocks, a buffer 76 and a bits monitor 78, have been added. Since B' is allowed to vary in time, the output from the MUX is VBR rather than CBR. An elastic buffer is used to smooth out the variation in bit rate. The output from the buffer is CBR. When the instantaneous rate from the VBR input rate (to the buffer) is higher than the constant output rate, data is temporary accumulated in the buffer. This data will be output in the future when the VBR input rate becomes lower than the constant output rate.

The bits monitor 78 keeps track of the number of bits exiting the multiplexer 12 as time progresses, it then computes the current level of B' based on this observation, together with the knowledge of the size of the buffer and the output channel rate of the buffer 76. This value of B' is not a "hard" limit on the number of bits allocated to the current blocks being compressed. Rather, it is a recommended target bit allocation. The D.C. is free to increase B' (if reasonably small distortion can simply not be achieved with this B') or decrease B' (if acceptable distortion can be achieved with lower B'). Increasing B' means bits have been taken from other groups of blocks and decreasing B' means bits can potentially be given to other groups of blocks. The possibility of D.C. to deviate from the recommended B' is the reason why the bits monitor must monitor the actual number of bits used at the multiplexer output. It should be noted that in deviating from the recommended B', it is possible that the buffer 76 may run into overflow (i.e., the input rate is higher than the output rate in the buffer for too long a time that there is insufficient space in the buffer to hold the newly arrived input data) and underflow (no data left in the buffer to be output) situations. Therefore, the D.C. should in general not deviate too substantially from the recommended B' in allocating bits. Thus, the bits monitor 78 may also indicate to D.C. how much deviation is allowed based on its knowledge of the buffer state.

Lastly, even when D.C. sets D' exactly according to the recommended B' from the bits monitor, there are scenarios where it is appropriate to vary B'. This might be the case, for instance, when the rate of the CBR channel used to transport the compressed data is "quasi" rather than "strict" constant: the rate is constant over a short time duration (say, on the scale of seconds) but is variable over a long time duration (say, on the scale of minutes). This slow changing of the channel may be a form of interaction between the communications network that transports the data and the compressor that has been previously agreed upon: when the traffic in the network becomes congested then the channel rate will be decreased, and when the traffic in the network is light then the channel rate will be increased. In this case, there is no need for the buffer since the compressor outputs data exactly according to the constant rate in effect at that moment in time. However, B' is quasi constant the way that the CBR channel rate is.

The invention has now been explained with reference to specific embodiments. Other embodiments will be apparent to those of ordinary skill in the art. (For example, the data segmented into blocks could be representative of discrete codewords concatenated in a string, rather than individual coefficients of a DCT, without departing from the scope and spirit of the invention). It is therefore not intended that this invention be limited except as indicated by the appended claims.

What is claimed is:

1. A method for compression of loss-tolerant video image data derived from multiple sources for conveyance at a predetermined fixed rate, said method comprising the steps of:

segmenting said video image data of each one of said multiple sources into corresponding video blocks, each one of said blocks corresponding to a single one of said sources, each block having a ranking based on source data, which source data is ranked in an order according to at least a first criterion, each said block having associated therewith a distortion metric to represent quality of the source data contained in the corresponding block;

ranking said blocks according to the distortion metric of each one of said blocks;

dropping at least selected first portions of selected ones of said blocks in accordance with said at least one criterion of said distortion metrics; and allocating at least selected second portions to other ones of said blocks in accordance with said at least one criterion on said distortion metrics.

2. The method according to claim 1 wherein said first portions and said second portions each comprise separately addressable grouped bits.

3. The method according to claim 1 wherein said first portions and said second portions comprise codewords.

4. The method according to claim 1 wherein said first portions comprise least significant bits and said second portions comprise other than least significant bits.

5. The method according to claim 1 wherein said first portions comprise bits and said second portions comprise bits.

6. The method according to claim 1 wherein said at least one criterion comprises distortion as a function of the number of bits in the block, and wherein said function provides a ranking.

7. The method according to claim 6 wherein said at least one criterion further comprises value of data within selected locations of an image.

8. The method according to claim 1 wherein said at least one criterion comprises values of data within selected locations of an image.

9. The method according to claim 1 wherein said at least one criterion comprises values of data within selected locations of different images, wherein said first portions comprise data of a subset of the images and said second portions comprise data of the rest of the images.

10. The method according to claim 1 wherein said at least one criterion varies across an image in accordance with variably acceptable distortion levels within locations of said image.

11. The method according to claim 10 wherein said at least one criterion comprises a function of value of data at selected locations in an image.

12. The method according to claim 1, wherein each block is pre-allocated a minimum number of bits.

13. The method according to claim 1, wherein each block is pre-allocated a minimum number of codewords.

14. The method according to claim 1, wherein each block is pre-allocated a minimum level of spatial frequency components.

15. The method according to claim 1 wherein each block is pre-allocated a minimum level of information and further including the step of partially compressing said information.

16. The method according to claim 1 further including the step of:

employing all of said data in a current frame as a reference for interframe encoding of a future frame.

17. The method according to claim 1 further including the step of:

employing all said data in a current frame as a reference for interpolative encoding of a future frame.

18. The method according to claim 1 further including the step of:

employing only said data in a current frame which was retained after said dropping step as a reference for interframe encoding of a future frame.

19. The method according to claim 1 further including the step of:

employing only said data in a current frame which was retained after said dropping step as a reference for interpolative encoding of a future frame.

20. The method according to claim 1 further including integrating said compression with other compression schemes for seamless primary and secondary compression.

21. The method according to claim 1 further including the step of dynamically varying said at least one criterion in time in accordance with a variable bit rate input.

22. A method for compression of loss-tolerant data comprising the steps of:

segmenting data into blocks, each block having data ranked in an order according to at least one criterion, each block being pre-allocated a minimum level of information and each block having associated therewith a distortion metric to represent quality of the data contained in the block;

partially compressing said information;

ranking said blocks according to the distortion metric of each one of said blocks;

dropping at least selected first portions of selected ones of said blocks in accordance with said at least one criterion of said distortion metrics;

allocating at least selected second portions to other ones of said blocks in accordance with said at least one criterion on said distortion metrics; and employing only said data in a current frame which was pre-allocated as a minimum level of information as a reference for interframe encoding of a frame.

23. A method for compression of loss-tolerant data comprising the steps of:

segmenting data into blocks, each block having data ranked in an order according to at least one criterion, each block being pre-allocated a minimum level of information and each block having associated therewith a distortion metric to represent quality of the data contained in the block;

partially compressing said information;

ranking said blocks according to the distortion metric of each one of said blocks;

dropping at least selected first portions of selected ones of said blocks in accordance with said at least one criterion of said distortion metrics;

allocating at least selected second portions to other ones of said blocks in accordance with said at least one criterion on said distortion metrics; and employing only said data in a current frame which was pre-allocated as a minimum level of information as a reference for interpolative encoding of a frame.

24. A method for compression of loss-tolerant video image data derived from disparate multiple sources for conveyance at a predetermined fixed rate, said method comprising the steps of:

segmenting data from said disparate multiple sources into video blocks, each block being associated with one source and having data in bits ranked in order of significance, each block having associated therewith a distortion metric as a function of the number of bits in the block to represent the quality of the data contained in the block;

ranking said blocks according to the distortion metric of each one of said blocks;

dropping the lowest significant bits of selected ones of said blocks having lowest distortion metrics; and allocating bits to other ones of said blocks having highest distortion metrics, in order to redistribute quality and equalize distortion among each one of said blocks.

25. A method for communication of video image information over a telecommunications channel, comprising:

compressing loss-tolerant data by:

segmenting video image data from disparate video sources into blocks, each block having said video image data in bits ranked in order of significance, each block having associated therewith a metric of distortion as a function of the number of bits per block to represent the quality of the video image data contained in each block;

ranking said blocks according to the distortion metric of each one of said blocks;

dropping the lowest significant bits of selected ones of said blocks having lowest distortion metrics; and allocating available bits to other ones of said blocks having highest distortion metrics, in order to redistribute quality and distortion among each one of said blocks to produce distortion-distributed blocks; and applying said distortion-distributed blocks to the communication channel.

26. A method for compression of loss-tolerant video image data from a plurality of variable bit rate inputs to produce a multiplexed constant bit rate output, said method comprising the steps of:

segmenting said video image data from said plurality of inputs into constant-sized blocks suitable for multiplexing in said constant bit rate output, each block having its data ranked in an order according to at least one criterion, each block having associated therewith a distortion metric to represent quality of the data contained in the block;

ranking said blocks according to the distortion metric of each one of said blocks;

dropping at least selected first portions of selected ones of said blocks in accordance with said at least one criterion of said distortion metrics and in order to be accommodated within constant-sized blocks;

allocating at least selected second portions to other ones of said blocks in accordance with said at least one criterion on said distortion metrics; and multiplexing all of said blocks into a single and constant bit rate data stream.

* * * * *